United States Patent
Jehle et al.

(10) Patent No.: US 9,828,681 B2
(45) Date of Patent: Nov. 28, 2017

(54) REDOX DEVICE

(71) Applicant: Astrium GmbH, Taufkirchen (DE)

(72) Inventors: Walter Jehle, Horgenzell (DE);
Joachim Lucas,
Herdwangen-Schoenach (DE);
Sebastian Markgraf, Immenstaad (DE)

(73) Assignee: AIRBUS DS GMBH, Taufkirchen (DE)

( * ) Notice: Subject to any disclaimer, the term of this patent is extended or adjusted under 35 U.S.C. 154(b) by 238 days.

(21) Appl. No.: 14/169,233

(22) Filed: Jan. 31, 2014

(65) Prior Publication Data

US 2014/0242478 A1 Aug. 28, 2014

(30) Foreign Application Priority Data

Feb. 27, 2013 (EP) ..................... 13156984

(51) Int. Cl.
*H01M 8/04* (2016.01)
*H01M 8/06* (2016.01)
(Continued)

(52) U.S. Cl.
CPC .................. *C25B 1/04* (2013.01); *C25B 9/08* (2013.01); *H01M 8/04089* (2013.01); *H01M 8/04223* (2013.01); *H01M 8/0662* (2013.01); *H01M 8/186* (2013.01); *H01M 8/04197* (2016.02); *H01M 8/083* (2013.01); *Y02E 60/366* (2013.01); *Y02E 60/528* (2013.01); *Y02P 70/56* (2015.11)

(58) Field of Classification Search
CPC ........... H01M 8/0662; H01M 8/04223; H01M 8/186; H01M 8/04089; C25B 1/04; C25B 9/08

USPC ......... 429/410, 418; 204/242; 205/628, 633, 205/637
See application file for complete search history.

(56) References Cited

U.S. PATENT DOCUMENTS 3,446,673 A * 5/1969 Manion .................. H01M 8/08
429/413
6,077,620 A * 6/2000 Pettit ...................... B01J 8/0438
429/425

(Continued)

FOREIGN PATENT DOCUMENTS

CA           1 198 710 A1    12/1985
DE     10 2007 027 720 A1   12/2008
(Continued)

OTHER PUBLICATIONS

European Search Report dated Aug. 9, 2013 issued in the corresponding EP patent application No. 13156984.0.
(Continued)

*Primary Examiner* — Sean P Cullen
(74) *Attorney, Agent, or Firm* — Posz Law Group, PLC (57) ABSTRACT

A redox device, in particular a hydrogen-oxygen redox device, has at least one redox unit, in particular a hydrogen-oxygen redox unit, which is intended for carrying out at least one redox reaction with consumption and/or production of a first gas, in particular hydrogen gas, and/or of a second gas, in particular oxygen gas. The redox device includes at least one residual gas purification unit which frees at least one residual gas in the redox unit of at least one gas impurity at least in at least one rest mode of the redox unit.

8 Claims, 3 Drawing Sheets

(51) Int. Cl.
*H01M 8/18* (2006.01)
*C25B 1/04* (2006.01)
*C25B 9/08* (2006.01)
*H01M 8/04089* (2016.01)
*H01M 8/0662* (2016.01)
*H01M 8/04223* (2016.01)
*H01M 8/083* (2016.01)
*H01M 8/04082* (2016.01)

(56) References Cited

U.S. PATENT DOCUMENTS

| | | | |
|---|---|---|---|
| 6,127,055 A * | 10/2000 | Simmons, Jr. | H01M 8/0247 429/483 |
| 6,277,508 B1 * | 8/2001 | Reiser | H01M 8/04291 422/182 |
| 6,514,635 B2 | 2/2003 | Van Dine et al. | |
| 6,569,298 B2 | 5/2003 | Merida-Donis | |
| 7,722,834 B2 | 5/2010 | Riegel et al. | |
| 2002/0098393 A1 | 7/2002 | Dine et al. | |
| 2002/0119365 A1 | 8/2002 | Tomazic | |
| 2002/0160242 A1 * | 10/2002 | Dagard | A61L 9/14 429/414 |
| 2004/0028966 A1 * | 2/2004 | Hibbs | H01M 8/04097 429/410 |
| 2005/0221148 A1 | 10/2005 | Goebel | |
| 2006/0051629 A1 | 3/2006 | Limbeck et al. | |
| 2006/0222912 A1 * | 10/2006 | Smith | C25B 9/18 429/418 |
| 2008/0213635 A1 | 9/2008 | Blaszczyk et al. | |
| 2009/0008261 A1 | 1/2009 | Kotzeva et al. | |
| 2009/0325012 A1 | 12/2009 | Nor | |
| 2010/0021778 A1 * | 1/2010 | Steinshnider | B01D 19/0042 429/419 |
| 2012/0276460 A1 * | 11/2012 | Kumei | H01M 8/04104 429/410 |
| 2012/0308906 A1 * | 12/2012 | Paganelli | H01M 8/04097 429/415 |

FOREIGN PATENT DOCUMENTS

| | | |
|---|---|---|
| EP | 1 674 424 A1 | 6/2006 |
| JP | 2004-521447 A | 7/2004 |
| JP | 2008-524780 A | 7/2008 |
| JP | 2009-110675 A | 5/2009 |
| JP | 2009-140677 A | 6/2009 |
| JP | 2010-282768 A | 12/2010 |

OTHER PUBLICATIONS

Partial English translation of the European Search Report and Search Opinion dated Aug. 9, 2013 for the corresponding EP patent application No. 13156984.0.
Office Action dated Jun. 9, 2015 in the corresponding CA application No. 2,843,655.
Office Action dated Oct. 14, 2016 issued in corresponding CA patent application No. 2,843,655.
Office Action dated Apr. 18, 2017 issued in corresponding JP patent application No. 2014-028574 (and English translation).

* cited by examiner

REDOX DEVICE

CROSS REFERENCE TO RELATED APPLICATION

This application is based on and incorporates herein by reference European Patent Application No. 13156984.0 filed on Feb. 27, 2013.

PRIOR ART

The invention relates to a redox device, in particular a hydrogen-oxygen redox device, having at least one redox unit, in particular a hydrogen-oxygen redox unit, which is intended for carrying out at least one redox reaction with consumption and/or production of a first gas, in particular hydrogen gas, and/or of a second gas, in particular oxygen gas, according to the preamble of claim 1.

Fuel cells and electrolyzers according to the prior art, in particular fuel cells and electrolyzers which involve hydrogen, oxygen and water as products or starting materials, are, in a rest mode in which they are not operated, flushed with air or neutral gases by means of a flushing process in order to avoid buildup of explosive mixtures such as hydrogen/oxygen mixtures by residual gases remaining in the gas spaces of the fuel cell or the electrolyzer in the rest mode. However, such a flushing process cannot be employed in the regenerative fuel cell systems which are presently in development, which consist of a system comprising a fuel cell and an electrolyzer and are intended for use in closed operation as an accumulator system because this flushing process would require opening of the regenerative fuel cell system. However, such a regenerative fuel cell system in particular is particularly prone to hydrogen/oxygen gas mixture hazards since only the electrolyzer is in operation during charging of the regenerative fuel cell system and the fuel cell is in a rest mode, and conversely only the fuel cell is in operation and the electrolyzer is in a rest mode during discharging of the regenerative fuel cell system.

It is the objective of the invention, in particular, to provide a generic redox device which avoids accumulation of harmful gas, in particular a hydrogen/oxygen gas mixture, without a flushing process. The objective of the invention is furthermore to provide a redox device which can be operated in the long term in closed operation without hazards due to formation of a hydrogen/oxygen gas mixture. The objective is achieved according to the invention by the features of claim 1, while advantageous embodiments and further developments of the invention can be derived from the dependent claims.

Advantages of the Invention

The invention proceeds from a redox device, in particular a hydrogen-oxygen redox device, having at least one redox unit, in particular a hydrogen-oxygen redox unit, which is intended for carrying out at least one redox reaction with consumption and/or production of a first gas, in particular hydrogen gas, and/or of a second gas, in particular oxygen gas.

It is proposed that the redox device comprises at least one residual gas purification unit which frees at least one residual gas in the redox unit of at least one gas impurity at least in at least one rest mode of the redox unit.

By a "redox device" is, in particular, meant an device having at least one redox unit. By a "redox unit" is meant a unit having at least two electrodes which are configured as at least one anode and at least one cathode and an electric circuit connecting the two electrodes, with at least one electrolyte arranged at least between the two electrodes and/or with at least one electrolyte-filled or ion-conducting membrane arranged between the two electrodes, wherein a redox reaction in which the first gas is oxidized and the second gas is reduced and these are converted, in a reaction with output of energy in the form of electric power, to form a product, preferably water, which is passed on into the surroundings or a storage tank, or in which, with input of energy in the form of electric power, a starting material, preferably water, is dissociated to generate a first gas, preferably molecular hydrogen, and a second gas, preferably molecular oxygen, and the first gas and the second gas are discharged into the surroundings or into storage tanks, is carried out by means of the unit. In particular, the redox unit is configured as a fuel cell in which molecular hydrogen, preferably in the form of hydrogen gas, and molecular oxygen, preferably in the form of oxygen gas, react to form water with the release of energy by generation of electric power and/or as an electrolyzer for hydrogen and oxygen in which water is dissociated into molecular oxygen and molecular hydrogen with input of energy in the form of an electric current. As an alternative, the hydrogen-oxygen redox unit can be configured for use of other chemical substances containing hydrogen atoms and oxygen atoms, instead of water, molecular hydrogen and/or molecular oxygen as product and/or starting material. Furthermore, the redox unit can be configured, instead of as a hydrogen-oxygen redox unit, as a redox unit for other chemical substances, which converts the other chemical substances in a redox reaction similar to the redox reaction of the hydrogen-oxygen redox unit, for example as a carbon monoxide-oxygen redox unit converting carbon monoxide and oxygen gas into carbon dioxide or dissociating carbon dioxide. A "redox reaction" is, in particular, to be understood as a reaction in which at least two chemical substances react with one another, with at least one chemical substance releasing electrons and thus being oxidized and at least one chemical substance taking up electrons and thus being reduced. "Hydrogen gas" is to be understood to mean, in particular, hydrogen in molecular form which is present as gas. "Oxygen gas" is to be understood to mean, in particular, oxygen in molecular form which is present as gas. An "electrolyte" is to be understood to mean, in particular, an ion-conducting material, preferably in the form of a solution, for example an alkaline solution.

In particular, the redox device can be configured as a regenerative fuel cell system having at least one fuel cell and at least one electrolyzer for hydrogen and oxygen coupled to the at least one fuel cell, wherein, in a charging process for storage of energy in the regenerative fuel cell system, the at least one electrolyzer for hydrogen and oxygen dissociates water from a stock of water into molecular hydrogen and molecular oxygen by means of an applied external electric current, the molecular hydrogen and the molecular oxygen each being discharged into storage tanks, and molecular hydrogen and molecular oxygen being converted into water in a redox reaction in the at least one fuel cell during a discharging process to release energy in the form of electric current. The regenerative fuel cell system thus fulfills an accumulator function. In particular, the regenerative fuel cell system can be configured for closed operation. A "closed operation" is to be understood to mean, in particular, operation in which the regenerative fuel cell system is operated over a plurality of charging-discharging cycles without exchange of material with the surroundings. "Operation without exchange of material with the surroundings" means, in particular, that the regenerative fuel cell system is equipped with an initial stock of water and/or molecular oxygen and/or molecular hydrogen in storage tanks, and only the initial stock of water and/or molecular oxygen and/or molecular hydrogen is reacted over the plurality of charging-discharging cycles and replenishing of the initial stock does not take place. In particular, removal of the storage tanks is not envisaged in an operation without exchange of material with the surroundings. However, the regenerative fuel cell system can in principle be configured with removable stores, so that in addition to an accumulator function in closed operation it assumes a function as charging station for providing filled storage tanks for a further fuel cell.

A "residual gas purification unit" is to be understood to mean, in particular, a unit which frees a residual gas of impurities, in particular solids or foreign gases, for example by filtering. In particular, the residual gas purification unit comprises at least one unit which condenses at least one type of gas in order to remove it from a gas flow and/or at least one unit which filters at least one type of gas from the gas flow and/or at least one unit in which at least one type of gas is converted into at least one further type of gas by catalysis, with the at least one further type of gas being able to be provided for a removal from the gas flow, in particular for filtering out and/or condensation. The at least one residual gas purification unit is preferably free of units and/or elements which require an exhaustible stock of material, in particular reaction materials and/or binding materials for a reaction and/or binding of an impurity, for removing the impurities from the residual gas. A "residual gas" is to be understood to mean, in particular, a quantity of gas in a redox unit which remains in gas spaces of the redox unit in a rest mode of the redox unit. A "rest mode of a redox unit" is to be understood to mean, in particular, at least one operating state of a redox unit in which a redox reaction is not carried out at all or in which a redox reaction takes place with greatly reduced output compared to a normal operating mode, for example a maximum of ten percent of output, advantageously a maximum of five percent of output and more preferably a maximum of one percent of output, compared to a normal operating mode. A "rest mode of a redox device" is to be understood to mean, in particular, at least one operating state of a redox device in which the redox device is not connected to an external electric circuit. In particular, a redox device having a high operational safety and a reduced cost of operation can be achieved by saving of a stock of inert flushing gas and of passage of inert flushing gas.

Furthermore, it is proposed that the at least one redox unit be configured as a fuel cell. In particular, a fuel cell having a high operational safety can be achieved.

In a further development of the invention, it is proposed that the fuel cell be configured as an alkaline fuel cell. An "alkaline fuel cell" is to be understood to mean, in particular, a fuel cell which uses an alkaline solution, in particular a potassium hydroxide solution, as electrolyte. Use of other alkaline solutions, for example hydrazine, as electrolyte is likewise possible. The hydrogen electrode and the oxygen electrode preferably consist at least partly of nickel. It is possible to achieve, in particular, an alkaline fuel cell having a high degree of operational safety and a reduced cost of operation by dispensing with a stock of inert flushing gas and of passage of inert flushing gas.

Furthermore, it is proposed that the at least one redox unit be configured as electrolyzer for producing hydrogen gas and/or oxygen gas. The electrolyzer is preferably configured as an alkaline electrolyzer which uses a potassium hydroxide solution immobilized in a membrane as electrolyte. The electrolyzer can in principle also be configured not for producing hydrogen gas and/or oxygen gas but for producing other gases by electrolytic dissociation of a starting material. In particular, the electrolyzer can be connected to removably mounted storage tanks which are charged with hydrogen gas and/or oxygen gas by the electrolyzer and are connected to a fuel cell for operation of the fuel cell, for example in a motor car. In particular, an electrolyzer for producing hydrogen gas and/or oxygen gas having high operational safety and reduced cost of operation can be achieved by saving of a stock of inert flushing gas and of passage of inert flushing gas.

Furthermore, it is proposed that the at least one residual gas purification unit comprise at least one catalyst unit for catalysis of a reaction of oxygen gas and hydrogen gas into water. A "catalyst unit" is to be understood to mean, in particular, a unit which is provided for catalyzing at least one particular reaction, for example a reaction of hydrogen and oxygen into water, at a predetermined place. In particular, the catalyst unit makes available at least one surface at which the reaction can take place more easily, for example a surface having a high affinity for molecular hydrogen and molecular oxygen, so that the probability of reaction of hydrogen gas and oxygen gas into water is increased at the surface. In particular, the catalyst unit comprises at least one catalyst element which preferably consists at least partly of a material which is catalytically active for the reaction of oxygen gas and hydrogen gas to into water. In particular, an effective residual gas purification unit can be realized with a low outlay in terms of apparatus.

In a further development of the invention, it is proposed that the at least one catalyst unit has at least one catalyst element which consists at least partly of a platinum metal. In particular, the at least one catalyst element has, at least partly, a coating comprising a platinum metal on at least one surface. In principle, the at least one catalyst element can also consist entirely of one platinum metal and/or a plurality of platinum metals. A "platinum metal" is to be understood to mean in particular platinum or another noble metal which has similar chemical behavior to platinum, in particular ruthenium, rhodium, palladium, osmium or iridium. In particular, nickel and darmstadtium, as elements of the platinum group, are different from platinum metals. It is possible to achieve, in particular, a chemically resistant catalyst element having a high catalytic performance.

Furthermore, it is proposed that the at least one catalyst element has a cavity structure. For the purposes of the present invention, a "cavity structure" is, in particular, a structure which has at least one cavity, preferably a plurality of cavities, through which the gases can diffuse and/or flow from one side of the structure to another side. In particular, the plurality of cavities is formed by pores. The catalyst element having a cavity structure can in principle also have cavities configured as channels and/or a network structure. Internal surfaces of the cavities are particularly preferably provided with a catalytically active coating of a platinum metal. It is possible to achieve, in particular, a catalyst element having a high proportion of a catalytically active surface area and thus a high purification performance.

It is also proposed that the at least one residual gas purification unit comprise at least one condensate precipitator for separating off water vapor. A "condensate precipitator" is to be understood to mean, in particular, a unit which is provided for separating off at least one gaseous impurity by condensation from a gas flow by means of subunits and/or elements. In particular, the at least one condensate precipitator comprises at least one heat exchanger and at least one separator which provides at least one surface for condensation. In particular, the condensate precipitator is provided for removing water vapor by condensation. It is possible to achieve, in particular, a unit which is simple in terms of apparatus for removing at least one impurity from a gas flow of residual gas.

Furthermore, it is proposed that the redox device of the invention comprise at least one residual gas circuit for continuous circulation of the at least one residual gas through the at least one residual gas purification unit in the rest mode of the redox unit. A "residual gas circuit" is to be understood to mean, in particular, a gas circuit from at least one gas space of a redox unit to the at least one gas space of the redox unit, with a gas flow being at least partly conveyed through at least one residual gas purification unit in the residual gas circuit. In particular, the at least one residual gas circuit comprises at least one transport device for circulating the gas, in particular at least one pump. It is possible to achieve, in particular, a redox device having a particularly high degree of safety in respect of hazards due to formation of a hydrogen/oxygen gas mixture.

Furthermore, it is proposed that the at least one residual gas purification unit be provided for purification of at least one feed gas or at least one product gas during at least one operating state of the at least one redox unit other than the rest mode. In particular, the at least one residual gas purification unit can be provided for purifying the at least one feed gas before and/or on entry into gas spaces of the at least one redox unit or purifying the at least one product gas before and/or on storage. In particular, the at least one feed gas and/or the at least one product gas can be formed by hydrogen gas, oxygen gas and/or water in gaseous form. It is possible, in particular, to reduce and/or avoid a hazard and/or a decrease in efficiency of the redox reaction in the redox unit.

In a further development of the invention, it is proposed that the redox device comprise at least one further redox unit which is coupled to the at least one redox unit so as to allow transfer of material. "Coupled so as to allow transfer of material" is intended to mean, in particular, that product materials of the at least one redox unit are utilized as starting materials for the at least one further redox unit and product materials of the at least one further redox unit are utilized as starting materials for the one redox unit and/or that the at least one redox unit and the at least one further redox unit have a common starting material stock and/or product stock and a stream of starting materials is fed into a plurality of similarly configured redox units. In particular, a use of incompletely converted starting material stocks can be achieved or a regenerative fuel cell system can be provided.

Furthermore, it is proposed that the at least one redox unit and the at least one further redox unit be configured as a fuel cell-electrolyzer pair. In particular, the at least one redox unit and the at least one further redox unit thus form a regenerative fuel cell system. In particular, an accumulator function of the redox device can be achieved.

It is also proposed that the at least one redox unit and the at least one further redox unit be connected at least via a joint storage tank. A "storage tank" is to be understood to mean, in particular, a tank for at least one gas and/or for at least one liquid. In particular, the joint storage tank is provided for being filled from the at least one redox unit and/or the at least one further redox unit with a product gas which is used as feed gas by the at least one further redox unit and/or the at least one redox unit. In particular, the at least one product gas is freed of impurities by means of the at least one residual gas purification unit before it enters the joint storage tank or the at least one feed gas is purified by means of the at least one gas purification unit after exit from the joint storage tank and before entry into a gas space. In particular, water can be introduced in gaseous or liquid form into the joint storage tank and stored and discharged in liquid form. It is possible, in particular, to achieve a reduction in the number of storage tanks required.

Furthermore, a method for operating a redox device according to the invention, in particular a hydrogen-oxygen redox unit, in which at least one residual gas in the redox unit is freed of at least one gas impurity by means of at least one residual gas purification unit at least in at least one rest mode of the redox unit is proposed. It is possible, in particular, to achieve operation of a redox device with a high degree of operational safety.

In addition, a method for operating a redox device according to the invention having at least one redox unit, in particular a hydrogen-oxygen redox unit, and at least one further redox unit, in particular a further hydrogen-oxygen redox unit, in which the redox device is operated in closed operation is proposed. For the purposes of the present invention, "the redox device is operated in closed operation" means, in particular, that the redox device is operated without exchange of hydrogen, oxygen and/or water with the surroundings over a plurality of charging-discharging cycles. A "charging-discharging cycle" is to be understood to mean, in particular, a cycle in which, at least in at least one procedural step, the redox device is connected to an external power source and an electrolyzer of the redox device is operated by means of the external power source in order to dissociate water in hydrogen and oxygen and, in at least one further procedural step, the redox device is connected to an external power consumer and makes power available to the external power consumer by operation a fuel cell. In particular, an accumulator function of the redox device and dispensing with complicated introduction of further hydrogen and oxygen in order to generate power by means of a fuel cell can be achieved.

DRAWINGS

Further advantages may be derived from the following description of the drawings. The drawings show exemplary embodiments of the invention. The drawings, the description and the claims contain numerous features in combination. A person skilled in the art will advantageously also look at the features individually and combine them to give useful further combinations.

DESCRIPTION OF THE EXEMPLARY EMBODIMENTS

Figure 1:
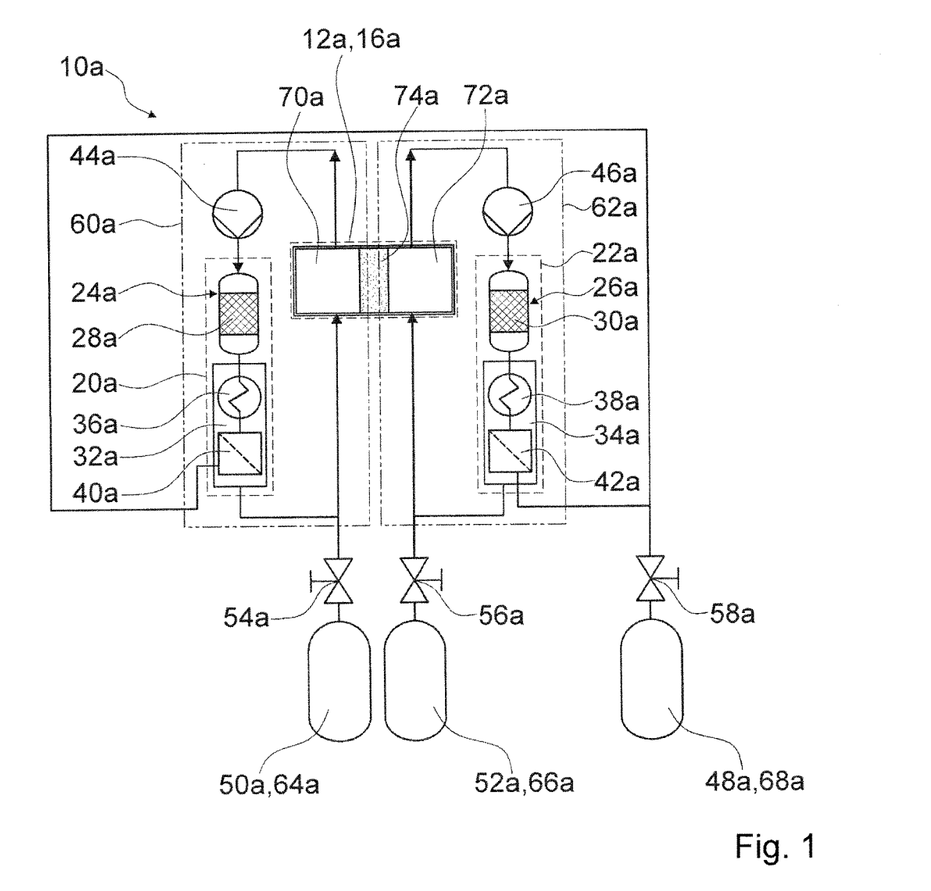
FIG. 1 a redox device according to the invention which comprises a redox unit configured as an alkaline fuel cell, with two residual gas purification units which each comprise a residual gas circuit, FIG. 2 an alternative redox device according to the invention which comprises a redox unit configured as alkaline electrolyzer, with two residual gas purification units which each comprise a residual gas circuit, and FIG. 3 an alternative redox device according to the invention having a redox unit configured as an alkaline fuel cell and having a redox unit configured as an alkaline electrolyzer, with the two units being operated in closed operation, and having four residual gas purification units which each comprise a residual gas circuit.

FIG. 1 shows a redox device 10a according to the invention, which is configured as hydrogen-oxygen redox device, having a redox unit 12a configured as hydrogen-oxygen redox unit which is provided for carrying out a redox reaction with consumption of hydrogen gas as a first gas and of oxygen gas as a second gas. The redox unit 12a is configured as a fuel cell 16a, more precisely as an alkaline fuel cell 16a, which uses an aqueous potassium hydroxide solution as electrolyte and is operated at an operating temperature in the temperature range from 80° C. to 200° C. The redox device 10a according to the invention comprises two residual gas purification units 20a, 22a which free one residual gas in each case in the redox unit 12a of gas impurities in a rest mode of the redox unit. The fuel cell 16a comprises two gas spaces 70a, 72a which are separated from one another by an electrolyte-filled electrode-membrane-electrode assembly 74a. In the electrode-membrane-electrode assembly 74a, a membrane is bounded by two block electrodes which can be connected in an electric circuit with an external power consumer (not shown). In an operating mode, hydrogen from a storage tank 64a configured as hydrogen store 50a is introduced via an opened valve 54a into the gas space 70a, and oxygen from a storage tank 66a configured as oxygen store 52a is introduced via an opened valve 56a into the gas space 72a. In a reaction zone of the electrode-membrane-electrode assembly 74a facing the gas space 70a, a redox reaction of hydrogen molecules of the hydrogen gas with hydroxide ions of the electrolyte into water takes place, liberating electrons which flow as an electric current through the external power consumer. In a reaction zone of the electrode-membrane-electrode assembly 74a facing the gas space 72a, a redox reaction of oxygen molecules of the oxygen gas with water originating from the electrolyte or previously produced in the fuel cell 16a, in which the oxygen atoms are reduced to oxygen molecules and are converted into hydroxide ions with uptake of electrons, takes place. An overall reaction in the reaction zones here produces water since more water molecules are produced in the reaction zone facing the gas space 70a than are reacted with oxygen gas to form hydroxide ions in the reaction zone facing the gas space 72a. Water formed is discharged in the form of water vapor via gas flows of excess hydrogen gas and oxygen gas.

The residual gas purification units 20a, 22a are provided for, in the rest mode, freeing residual gas which has remained in the gas spaces 70a, 72a of impurities. The residual gas purification unit 20a frees, in the rest mode, residual hydrogen gas in the gas space 70a of impurities due to oxygen gas which has diffused through the electrode-membrane-electrode assembly 74a from the gas space 72a and due to water vapor. The residual gas purification unit 22a analogously frees residual oxygen gas in the gas space 72a in the rest mode of impurities by means of hydrogen gas and water vapor. The redox device 10a comprises two residual gas circuits 60a, 62a for continuous circulation of the residual gases through the residual gas purification units 20a, 22a in the rest mode of the redox unit 12a. In the residual gas circuits 60a, 62a, the residual gas is pumped around by means of, in each case, a transport unit configured as pump 44a, 46a. The residual gas purification units 20a, 22a are additionally provided for purifying feed gases during an operating state other than the rest mode of the redox unit 12a and purify excess introduced hydrogen gas and oxygen gas which in the operating state is passed from the gas spaces 70a, 72a through the residual gas circuits 60a, 62a via the residual gas purification units 20a, 22a.

The residual gas purification units 20a, 22a each comprise a catalyst unit 24a, 26a for catalyzing a reaction of oxygen gas and hydrogen gas into water, which each have a catalyst element 28a, 30a which consists partly of a platinum metal. The catalyst elements 28a, 30a each have a cavity structure configured as a pore structure in a support material. Surfaces of the pore structure of the catalyst element 28a, 30a are coated with platinum, wherein in principle another platinum metal such as palladium or iridium, for example, can be used instead of platinum. The catalyst elements 28a, 30a make available a large platinum-coated surface which can bind hydrogen molecules and oxygen molecules and thus increases a probability for a reaction to form water. Contamination by foreign gas is thus removed from the residual gas by the catalyst units 24a, 26a. The catalyst units 24a, 26a can have connecting lines to the water store 48a, which discharge water in liquid form. As an alternative, the water can be vaporized into water vapor or condensation of water can be prevented by means of a separate heating element and/or a temperature of the redox unit 12a so that the water is separated off in a downstream section of the residual gas circuits 60a, 62a. The residual gas purification units 20a, 22a each comprise a condensate precipitator 32a, 34a for removing water vapor, which condensate precipitators each have a heat exchanger 36a, 38a for cooling the residual gas and a separator 40a, 42a. Water vapor is condensed and separated off from the residual gas by means of the heat exchanger 36a, 38a and the separator 40a, 42a. The condensate precipitators 32a, 34a are connected via lines to a storage tank 68a configured as water store 48a, with the lines being closed in a rest mode by closing a valve 58a. At the beginning of the rest mode, in which no redox reaction or only a greatly reduced redox reaction of the alkaline fuel cell 16a takes place, the valves 54a, 56a are closed. The water formed in the redox reaction in the fuel cell 16a is thus conveyed via the condensate precipitators 32a, 34a to the water store 48a to be stored.

In a method for operating the redox device 10a, residual gases of hydrogen and oxygen in the redox unit 12a, which have remained in the gas spaces 70a, 72a in a rest mode of the redox unit 12a, are freed of at least one gas impurity by the residual gas purification units 20a, 22a. In addition, in the method for operating the redox device 10a, the starting gases hydrogen and oxygen are freed of impurities in an operating state other than the rest mode by means of the residual gas purification units 20a, 22a by conveying excess introduced hydrogen gas and oxygen gas from the gas spaces 70a, 72a through the residual gas purification units 20a, 22a in the residual gas circuits 60a, 62a by means of the pumps 44a, 46a before they are reintroduced into the gas spaces 70a, 72a.

Figure 2:
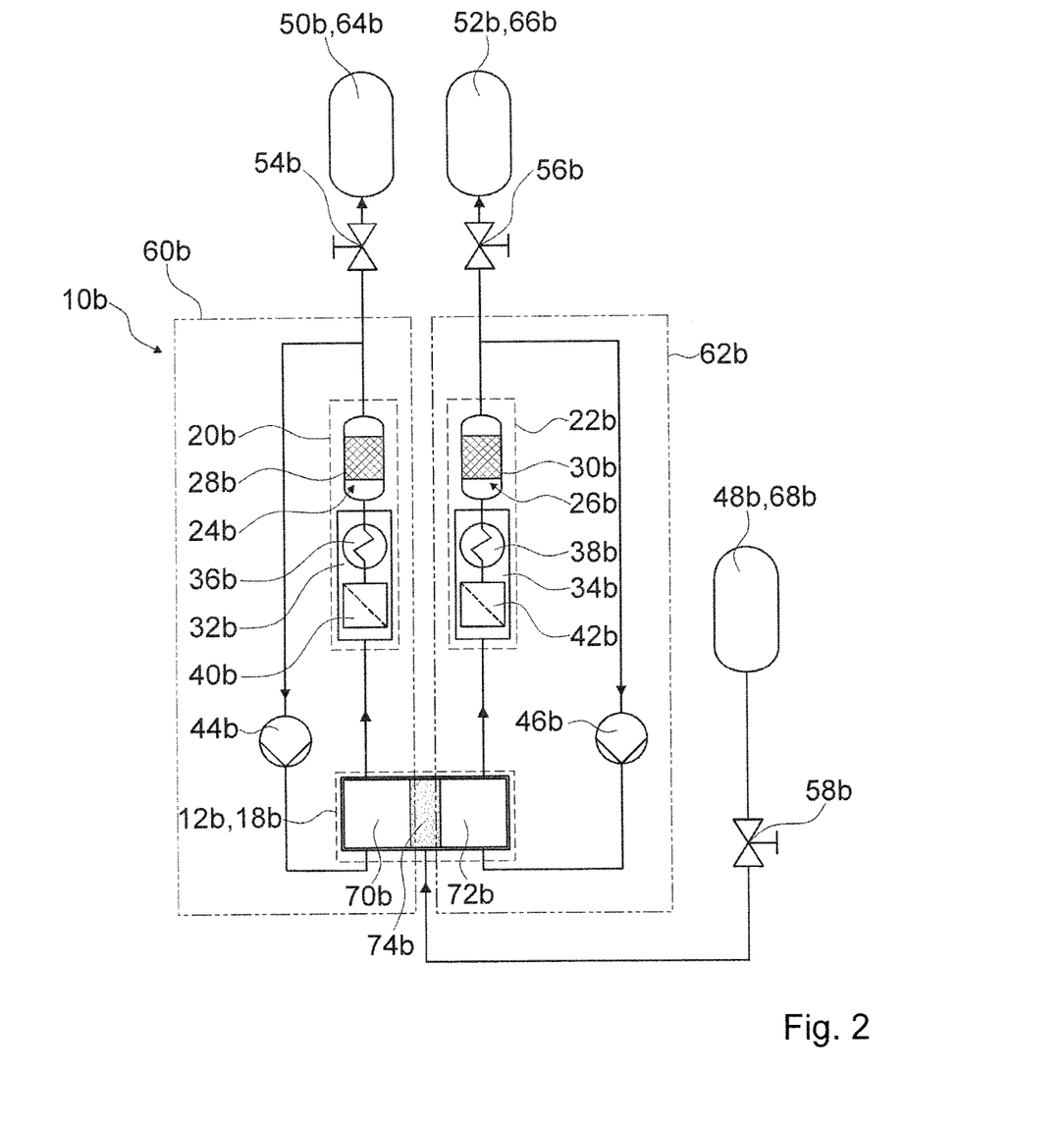
Figure 3:
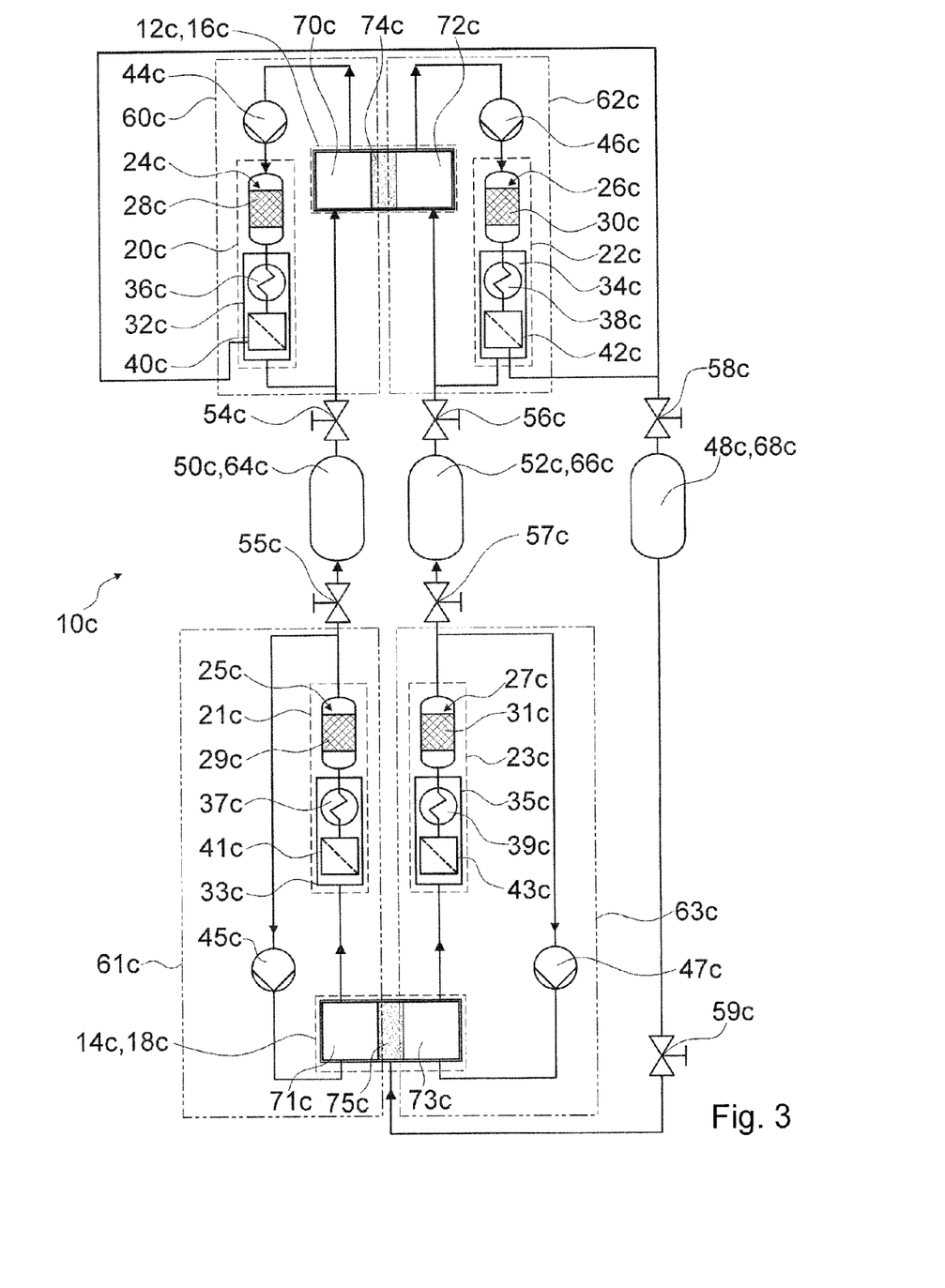

Two further working examples of the invention are shown in FIGS. 2 and 3. The following descriptions and the drawings are restricted essentially to the differences between the working examples, with reference being made in respect of components having the same names, in particular in respect of components having the same reference numerals, in principle also to the drawings and/or the description of the other working examples, in particular FIG. 1. To distinguish the working examples, the letter a follows the reference numerals of the working example in FIG. 1. In the working examples of FIGS. 2 and 3, the letter a is replaced by the letters b and c.

A redox device 10b shown in FIG. 2, which is configured as hydrogen-oxygen redox device, comprises a redox unit 12b which is configured as an alkaline electrolyzer 18b and is provided for carrying out a redox reaction to produce hydrogen gas as a first gas and oxygen gas as a second gas, and two residual gas purification units 20b, 22b, which are configured analogously to the previous working example, and catalyst units 24b, 26b having catalyst elements 28b, 30b and also condensate precipitators 32b, 34b for separating out water vapor which each comprise a heat exchanger 36b, 38b for cooling the residual gas and a separator 40b, 42b. The residual gas purification units 20b, 22b are arranged in residual gas circuits 60b, 62b through which residual gas is pumped in each case by means of a pump 44b, 46b. The redox unit 12b configured as alkaline electrolyzer 18b for producing hydrogen gas and oxygen gas converts, in an electrochemical redox reaction using electric energy supplied from an external power source (not shown), water which has been taken from a storage tank 68b configured as water store 48b and is then fed via an opened valve 58b to the electrolyzer 18b, and therein to a membrane of an electrode-membrane-electrode assembly 74b, into hydrogen gas and oxygen gas which are subsequently stored in storage tanks 64b, 66b configured as hydrogen store 50b and oxygen store 52b via opened valves 54b, 56b. The redox reaction of electrolytic dissociation of water carried out in the electrolyzer 18b represents a reversal of the synthesis of water from hydrogen gas and oxygen gas demonstrated in the previous working example. In a method for operating the redox device 10b, residual gases of hydrogen and oxygen which had remained in the gas spaces 70b, 72b of the redox unit 12b in a rest mode of the redox unit 12b are freed of at least one gas impurity by means of the residual gas purification units 20b, 22b. Before storage, hydrogen gas and oxygen gas formed are passed through the residual gas purification units 20b, 22b in order to purify the product gases. Thus, in the method for operating the redox device 10b, the product gases hydrogen and oxygen are freed of impurities by the residual gas purification units 20b, 22b in an operating state other than the rest mode.

FIG. 3 shows a redox device 10c according to the invention having a redox unit 12c which is provided for carrying out a redox reaction with consumption of hydrogen gas as a first gas and of oxygen gas as a second gas and having at least one further redox unit 14c which is coupled, so as to allow exchange of material, to the at least one redox unit 12c. The redox device 10c according to the invention is configured as hydrogen-oxygen redox device, and the redox unit 12c and the further redox unit 14c are configured as hydrogen-oxygen redox units. Coupling of the redox unit 12c with the further redox unit 14c so as to allow exchange of material is implemented in such a way that a product of the redox unit 12c is utilized as starting material for the further redox unit 14c and products of the further redox unit 14c are used as starting materials for the redox unit 12c. The redox unit 12c is configured as an alkaline fuel cell 16c and the further redox unit 14c is configured as an alkaline electrolyzer 18c for producing hydrogen gas and oxygen gas. The redox unit 12c and the further redox unit 14c are thus configured as a fuel cell-electrolyzer pair. In principle, it is also conceivable to provide, in an alternative embodiment, two further redox units 14c of which one is provided for producing hydrogen gas and another is provided for producing oxygen gas. The redox device 10c is provided for alternately operating the fuel cell 16c for release of energy with production of water from hydrogen gas and oxygen gas and the electrolyzer 18c is provided for uptake of energy with consumption of water by dissociation into hydrogen gas and oxygen gas, thus functioning as accumulator. The redox device 10c is provided for closed operation by an initial stock of hydrogen gas, oxygen gas and water being interconverted without supplementation from external stocks over a plurality of charging-discharging cycles with alternating operation of the fuel cell 16c and the electrolyzer 18c. The redox unit 12c and the further redox unit 14c are connected via joint storage tanks 64c, 66c, 68c which each store starting materials or products of the redox reactions.

The redox device 10c comprises four residual gas purification units 20c, 21c, 22c, 23c which, in a rest mode of the redox unit 12c or of the further redox unit 14c, each purify a residual gas from a gas space 70c, 71c, 72c, 73c. The residual gas purification units 20c, 21c, 22c, 23c each comprise a catalyst unit 24c, 25c, 26c, 27c for catalyzing a reaction of oxygen gas and hydrogen gas to form water, in each case having a catalyst element 28c, 29c, 30c, 31c which has a cavity structure, with the surfaces of the cavities being coated with platinum. The residual gas purification units 20c, 21c, 22c, 23c each further comprise a condensate precipitator 32c, 33c, 34c, 35c for separating off water vapor, each having a heat exchanger 36c, 37c, 38c, 39c and a separator 40c, 41c, 42c, 43c. The residual gas purification units 20c, 21c, 22c, 23c are arranged in residual gas circuits 60c, 61c, 62c, 63c in which the residual gas is passed through the residual gas purification units 20c, 21c, 22c, 23c by means of pumps 44c, 45c, 46c, 47c.

A charging-discharging cycle of the redox device 10c is realized as follows. In a first step, the redox unit 12c is operated in a largely rest mode and the further redox unit 14c is operated in an operating state other than a rest mode. A valve 59c is opened while a valve 58c is closed, so that water is conveyed from the storage tank 68c configured as water store 48c via a line to the further redox unit 14c configured as electrolyzer 18c and in the further redox unit 14c goes to an electrode-membrane-electrode assembly 75c where it is dissociated electrolytically by means of electric current from an external energy source (not shown) into hydrogen gas and oxygen gas. Hydrogen gas and oxygen gas formed are conveyed via the gas spaces 71c, 73c and lines with opened valves 55c, 57c to the joint storage tanks 64c, 66c configured as hydrogen store 50c and oxygen store 52c, with these gases going through the residual gas purification units 21c, 23c beforehand in order to purify product gases. In the method for operating the redox device 10c, the residual gas purification units 21c, 23c are thus provided for purification of the product gases during an operating state other than the rest mode in the further redox unit 14c. During this, residual gas in the gas spaces 70c, 72c of the redox unit 12c is circulated in residual gas circuits 60c, 62c by means of the pumps 44c, 46c and purified in the residual gas purification units 20c, 22c. Energy for operation of the pumps 44c, 46c can be made available from the external power source, a separate external or internal power source, which can be formed, for example, by a battery, or from operation of the fuel cell 16c at preferably lower power in the largely rest mode, which can be effected by slight opening of the valves 54c, 56c. In a further step, the redox unit 12c is operated in an operating state and the further redox unit 14c in a rest state while the redox device 10c is connected to an external power consumer. The valves 55c, 57c, 59c are closed during this step, while the valves 54c, 56c, 58c are opened in order to convey hydrogen gas and oxygen gas from the hydrogen store 50c and the oxygen store 52c into the gas spaces 70c, 72c where they react by means of a previously explained redox reaction in an electrode-membrane-electrode assembly 74c to form water and release electric power. Water formed is entrained as water vapor in gas flows of hydrogen gas and oxygen gas and separated out from the gas flows by means of the condensate precipitators 32c, 34c. Water which has been separated out is conveyed via lines and the opened valve 58c into the storage tank 68c configured as water store 48c. In this step, residual gases are purified by means of the residual gas purification units 21c, 23c in the further redox unit 14c, with them being pumped around the residual gas circuits 61c, 63c by the pumps 45c, 47c. Energy for operation of the pumps 45c, 47c can be supplied by an internal energy source of the redox device 10c or preferably by the fuel cell 16c.

In a method for operating the redox device 10c, residual gases in the redox unit 12c or the further redox unit 14c are freed of gas impurities by the residual gas purification units 20c, 21c, 22c, 23c in a rest mode of the redox unit 12c or of the further redox unit 14c. Furthermore, the redox device 10c is operated closed in a method for operating the redox device 10c. In particular, in the method for closed operation of the redox device 10c, the redox unit 12c configured as fuel cell 16c is continually operated with at least low power output in order to provide energy for operation of the pumps 44c, 45c, 46c, 47c in the residual gas circuits 60c, 61c, 62c, 63c. In a rest mode of the redox device 10c, in which the redox device 10c is connected neither to an external power consumer nor to an external power source, the electrolyzer 18c is thus in a rest mode and the fuel cell 16c is operated in a largely rest mode. The largely rest mode corresponds to a state of operation of the fuel cell 16c in which this cell is operated at a power output sufficient for operation of the pumps 44c, 45c, 46c, 47c, with the power output corresponding to one thirtieth of power output in normal operation in which the fuel cell 16c is operated to supply power to the external power consumer. In a charging process of the redox device 10c, in which the redox device 10c is connected to an external power source and the electrolyzer 18c is operated, the fuel cell 16c can be operated in the largely rest mode or in a rest mode; in the latter case, the external power source supplies energy to the pumps 44c, 45c, 46c, 47c. In an operating mode of the fuel cell 16c, in which the fuel cell 16c supplies energy for an external power consumer, part of the power can be branched off for operation of the pumps 44c, 45c, 46c, 47c.

In an alternative embodiment of the redox device 10c, it is in principle possible to purify gas flows from the hydrogen store 50c or the oxygen store 52c before entry into the gas spaces 70c, 72c by passing the gas flows through part of the residual gas circuits 60c, 62c.

The invention claimed is:

1. A method for operating a redox device comprising:
providing the redox device that comprises at least one redox unit, at least one residual gas purification unit with a catalyst unit and with a condensate precipitator that is serially connected to the catalyst unit, at least one residual gas circuit with a pump that is directly connected through piping to the redox unit, and at least one further redox unit that is coupled to the at least one redox unit, the at least one redox unit and the at least one further redox unit are configured as a fuel cell-electrolyzer pair;

transferring material to the at least one redox unit by the at least one further redox unit;

consuming and/or producing a first gas and/or a second gas in at least one redox reaction by the at least one redox unit;

operating the redox unit in a rest mode in which the redox unit operates at less than 10% output of a normal operating mode of the redox unit and the redox unit is disconnected from an external electric circuit;

pumping at least one residual gas to continuously circulate through the at least one residual gas circuit by the pump during the rest mode of the redox unit;

freeing at least one gas impurity from the at least one residual gas in the redox unit by catalyzing at least one chemical reaction via the catalyst unit within the at least one residual gas purification unit during at least the rest mode of the redox unit;

removing water vapor from the at least one residual gas by the condensate precipitator during the rest mode of the redox unit.

2. The method for operating a redox device according to claim 1, wherein an electrolyzer of the fuel cell-electrolyzer pair produces hydrogen gas as the first gas and/or oxygen gas as the second gas.

3. The method for operating a redox device according to claim 1, further comprising
separating off the water vapor by the condensate precipitator.

4. The method for operating a redox device according to claim 1, further comprising
purifying at least one feed gas or at least one product gas by the residual gas purification unit during at least one operating state of the redox unit other than the rest mode.

5. The method for operating a redox device according to claim 1, wherein the redox device is operated in closed operation.

6. The method according to claim 1, wherein the residual gas is pumped around in the at least one residual gas circuit in continuous circulation in the rest mode of the redox unit.

7. The method for operating a redox device according to claim 1, wherein the catalyst unit catalyzes a reaction of oxygen gas as the second gas and hydrogen gas as the first gas into water.

8. The method for operating a redox device according to claim 7, wherein the at least one chemical reaction is catalyzed by a platinum metal of a catalyst element of the catalyst unit.

* * * * *